Figure 1:
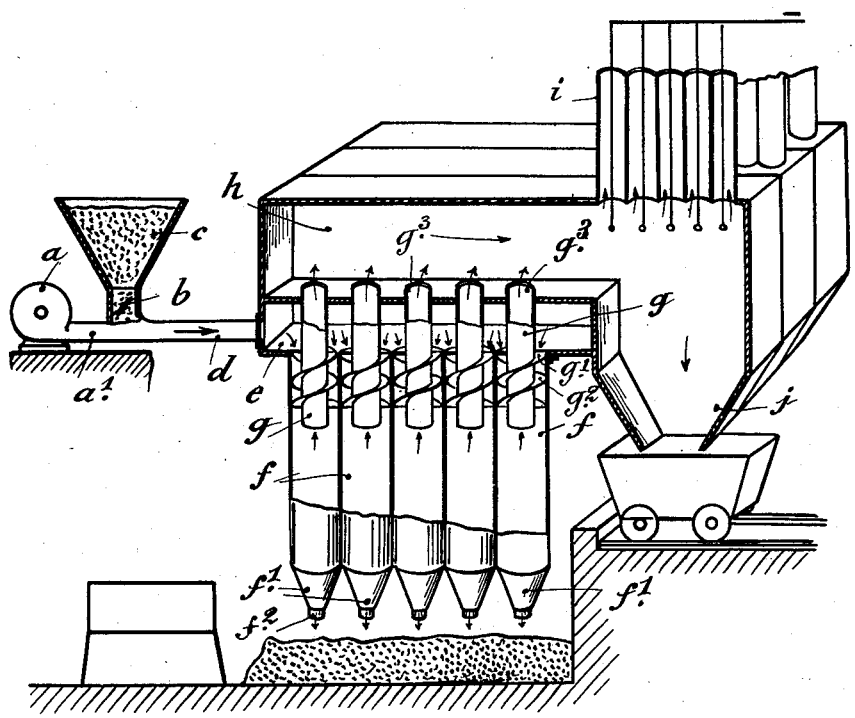

April 9, 1935. E. SOYEZ ET AL 1,997,125

SEPARATION OF FOREIGN BODIES FROM POWDERED MATERIALS

Filed July 26, 1932 4 Sheets-Sheet 2

Inventors
Emile Soyez
Marcel Cherouvrier
By Cameron, Kerkam & Sutton
Attorneys

Patented Apr. 9, 1935

1,997,125

UNITED STATES PATENT OFFICE 1,997,125

SEPARATION OF FOREIGN BODIES FROM POWDERED MATERIALS

Emile Soyez, Paris, and Marcel Chérouvrier, St. Cyr-sur-Loire, France

Application July 26, 1932, Serial No. 624,866 In France August 6, 1931

3 Claims. (Cl. 209—144)

We have filed applications in France on the 6th August, 1931, and 1st July, 1932.

The present invention has for its principal object the provision of means for the treatment of powdered materials such as rocks containing kaolin, fine cements, micas or the like in order to separate from them in a dry way the impurities which are physically associated with them. In the case of rocks containing kaolin the aforesaid means render it possible by the employment of a treatment operated exclusively in the dry way, to separate from the said rocks pure kaolin whilst eliminating the free silica and the micas. It is to be understood that the complete treatment of the materials in question includes the ordinary preliminary treatment consisting in disintegrating the said materials, for instance, by crushing them. The invention relates to the final part of the treatment of such materials, i. e. the elimination from the powdered material prepared in the usual manner, of all foreign bodies so as to obtain a fine merchantable powder capable of being employed either directly or for conversion into other materials by manufacturing processes.

The invention consists partly in the novel application and adaptation to an installation of suitable type, of constructional elements consisting of the apparatuses known under the name of "Cyclone" separators which are at present employed for removing powdered materials or dust from air or gas.

The invention comprises the combination constituting the installation as a whole which is adapted for the separation of the powdered materials and also resides in the improvements made in the aforesaid apparatus of the known "Cyclone" type for the purpose of adapting them to the particular application for which they are intended.

The said known "Cyclone" apparatuses which are suitably adapted and applied for the purpose in question and constitute essential parts of the installation for carrying out the process according to the invention, comprise a cylindrical drum having an open truncated conical lower part, into which drum the gases which are to be purified are admitted by blowing or aspirating, the said gases passing into an annular space located between the internal wall of the said drum and an axial conduit which is open at its two ends and which extends into the drum to a suitable depth. In the said annular space which is in general arranged so as to constitute a helicoidal conduit, a rotary movement is imparted to the gases and the impurities which they contain in suspension are thrown by centrifugal force against the wall of the drum and are collected at the lower part thereof whilst the gases which no longer contain any substantial amount of solid matter in suspension are discharged through the end of the axial conduit.

According to the present invention apparatuses of the known "Cyclone" type are adapted to be employed for the treatment for separation purposes of powdered materials such as powdered kaolin, fine cements, micas and the like.

For the treatment a stream of inert gas or simply of air which is practically pure at the commencement is employed which air is then charged with the powdered materials to be treated either by aspirating or blowing them from a charging device preferably adapted to deliver continuously. The gas or air thus charged is then admitted into the "Cyclone" apparatuses which, in view of the particular function they fulfil in the process according to the invention, are hereinafter denominated "Cyclone" selectors.

In the constructional elements of the installation according to the invention a selective operation, i. e. a separation of materials as the result of different densities actually takes place with a view to the removal in association with the aforesaid gas, of the valuable powders which it is desired to obtain. By the centrifugal action the foreign bodies which are heavier are thrown upon their discharge from the annular inlet conduit for the stream which carries them, towards the wall of the drum, whilst the fine powders which are of much less weight remain in suspension in the gaseous mixture which occupies the central part of the drum and which is discharged in this manner through the axial conduit at the upper opening of the latter, from which point the said fine powders are conveyed towards filtering devices which in the preferred constructional form according to the invention are, as will be indicated below, constituted by electrical filters of known type.

Some preferred methods and apparatus for carrying out the invention in practice are illustrated in the accompanying drawings, in which Fig. 1 is a perspective diagrammatic sectional view of an installation according to the invention for the treatment of powdered material, such as powdered kaolin obtained after drying, crushing and sifting the earths for the elimination of the rougher foreign matters.

Figure 4:
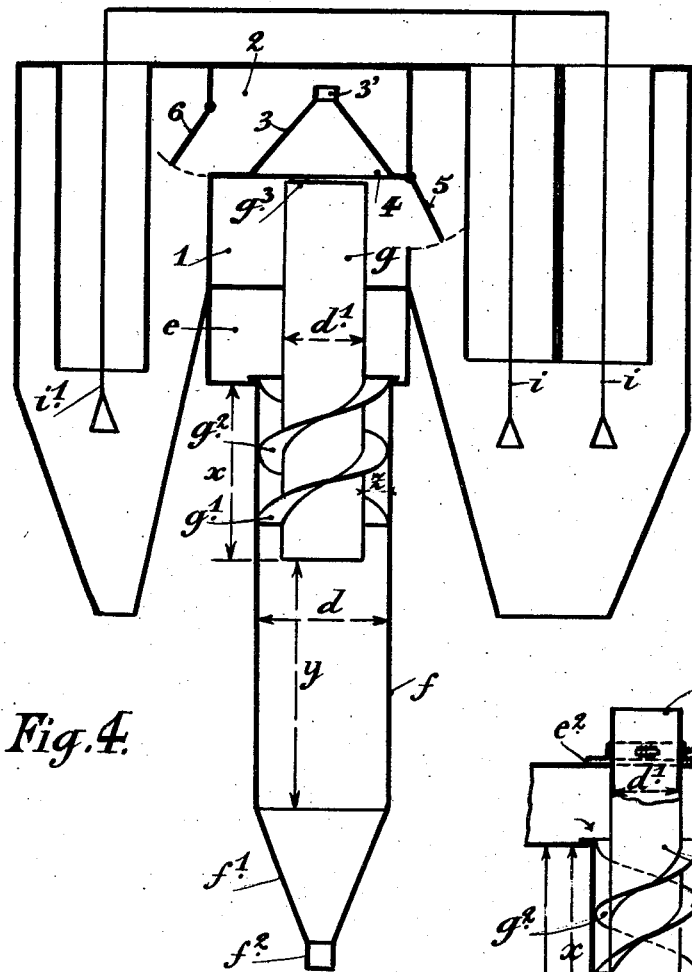
Figure 2:
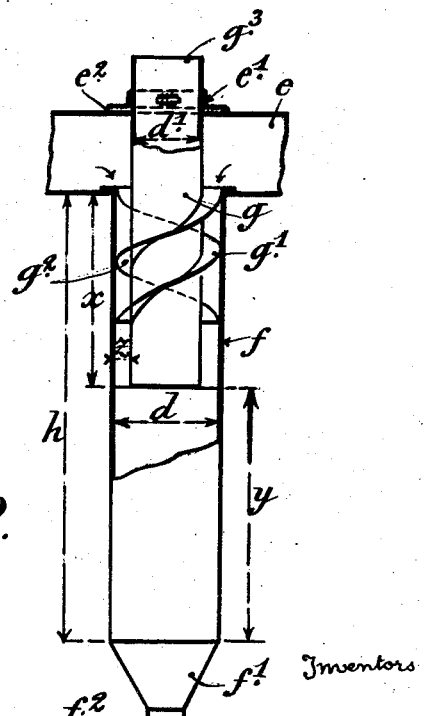
Figure 3:
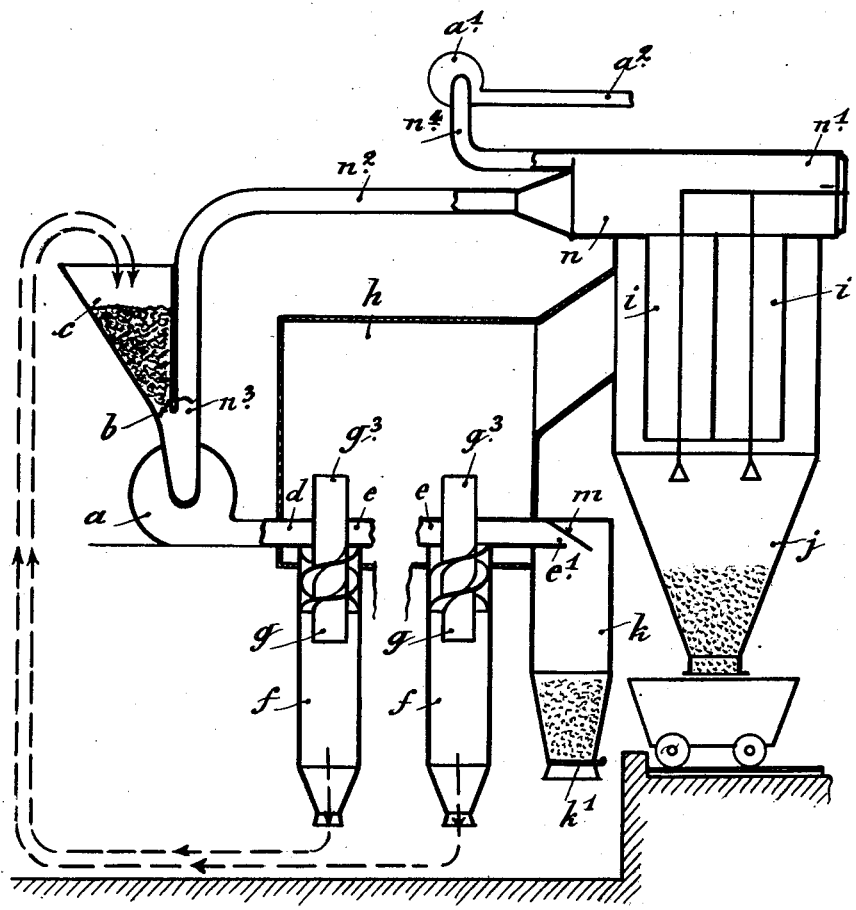
Figure 5:
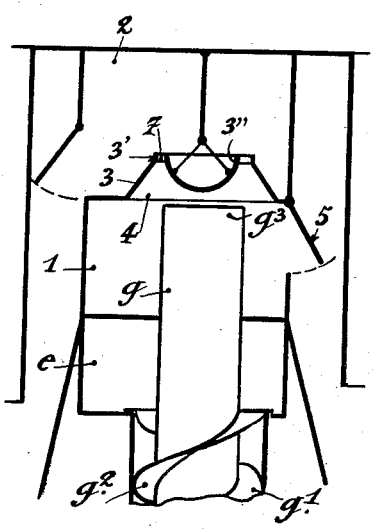
Figure 6:
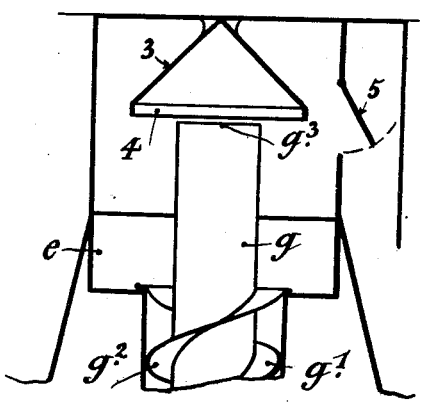
Figure 7:
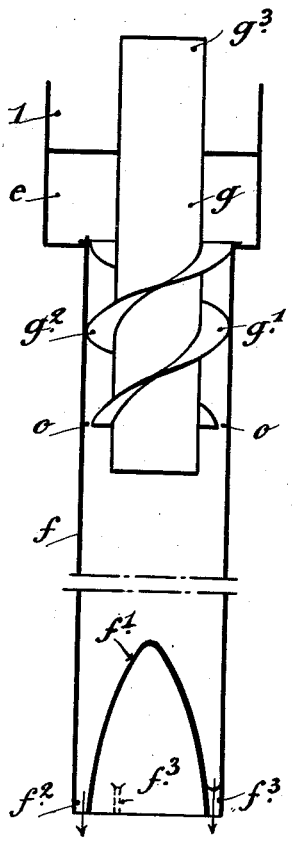

Fig. 2 is a diagrammatic sectional elevation of one of the Cyclone selectors forming part of the aforesaid installation, Fig. 3 is a diagrammatic view of a modified installation according to the invention, Fig. 4 is a diagrammatic axial longitudinal section of a Cyclone selector combined with a special auxiliary device according to the invention for collecting the selected materials, Fig. 5 is a diagrammatic partial section similar to that of Fig. 4 showing a modification of the auxiliary device, Fig. 6 shows a second modification of the said auxiliary device, Fig. 7 shows diagrammatically in longitudinal section a particular construction of the lower part of the drum of the Cyclone selector, as also a method of construction of the helicoidal admission conduit for the gas charged with the powdered materials which are to be treated.

In applying the invention in practice, for instance in the treatment of kaolins, the raw material which has been first dried, either by simply depositing in a heap or by the aid of a drier in the case of very moist earths, is first disintegrated, for instance in a machine of the ordinary drum type. The disintegrated matter is sifted through a relatively rough sieve serving to eliminate the rough silex and the foreign bodies capable of damaging the parts of the installation serving for the subsequent treatment according to the invention.

In Fig. 1, which shows one constructional form of the said installation, the reference letter $a$ denotes a blowing apparatus, such as a fan, the discharge pipe of which is connected to a rotary distributor of known type $b$ arranged at the lower end of a charging hopper or funnel $c$. At the outlet of the distributor the current of air becomes charged with the kaolin which has undergone the preliminary preparation referred to above (drying, disintegration and rough sieving) and is conveyed through a conduit $d$ into a closed admission chamber $e$, into the lower part of which the drums $f$ of a battery of Cyclone selectors open. At the lower ends $f^1$ of the drums the foreign bodies are discharged, whilst the axial conduits $g$ provided for the discharge of the stream of air charged with purified kaolin, pass through the said chamber $e$ and open at their upper ends $g^3$ into a longitudinal chamber $h$ communicating with the exterior at its upper part through the medium of a battery of electric filters $i$ of known type. The chamber $h$ communicates at its lower part with a discharge conduit $j$ into which the purified separated materials which are periodically detached from the walls of the filter $i$, by submitting the latter to mechanical shaking action in known manner, descend.

This chamber $h$ is of such size as to permit the air entering therein through the conduits $g^3$ to materially expand and thus avoid any back pressure which might pass any of the ultra fine particles back to the rear.

One preferred form of the Cyclone selector is illustrated in Fig. 2. It comprises a cylindrical vertical drum $f$ terminating at its lower extremity in a truncated conical part $f^1$ having a cylindrical mouth $f^2$ through which the heavy materials pass downwards and can be removed during the centrifugal movement communicated to the stream of air charged with the materials under treatment.

The apparatus is provided with an axial conduit $g$ which is open at its two ends, and with one or more helicoidal guides for the gaseous stream carrying the powdered material, which guides form conduits between the upper part of the interior wall of the drum $f$ and the exterior wall of the axial conduit $g$. Two helices $g^1$, $g^2$ may, for example, be employed. The internal diameter $d^1$ of the axial conduit $g$ for the discharge of the gaseous stream charged with the finely powdered materials which are to be recovered, should constitute an important fraction of the diameter $d$ of the drum $f$, the said fraction being preferably between ⅝ and ⅞. By the choice of these conditions any objectionable counter-pressure in the interior of the tube $g$ is avoided with certainty, so that the free discharge of the stream charged with the fine powder is ensured. Moreover, the annular admission passage for the stream passing into the drum is thus made of suitable width $z$, which, in conjunction with the height $x$ of the axial conduit $g$ (which height is preferably equal to between $1.5d$ and $3.5d$), renders it possible to maintain a considerable admission velocity in the stream during the desired period in order that the bodies which are to be removed may be thrown against the wall of the drum whilst the fine products which are to be recovered—and of which the density and consequently the kinetic energy is lower—are retained in the gaseous stream. The throttling of the stream in the lower truncated conical part $f^1$—$f^2$ of the drum causes a return of the said stream towards the axis from below upwards, which action facilitates the escape through the conduit $g$ of the stream which no longer contains the foreign bodies and particularly the heavier materials, which latter can, for the most part, not be carried upwards again by the ascending stream.

By making the height indicated by the reference letter $y$ large and, in fact, greater than $1.5d$ and approximating to $3.5d$, but not, in general, exceeding the last named figure, it is rendered possible for the heavy particles which would be picked up again by the ascending stream, to be thrown by the centrifugal force against the wall of the drum, it being possible for the fine materials to be picked up again by the descending stream, which might happen if the height $y$ were made too great.

The characteristic dimensions thus given to the drum $f$ render it possible to construct the latter, according to the invention, of a material such as glass or fibre—which is particularly important for the treatment of kaolins—so that the admixture of metallic particles torn off during the centrifugation of the material treated is practically impossible. It is to be understood that not only the body of the drum $f$, but also the axial discharge conduit $g$ may be made of glass.

The axial conduit $g$ is preferably so arranged that its position is adjustable, i. e. so that the depth $x$ to which it projects into the drum may be varied. For this purpose, as is shown in Fig. 2, two half collars $e^1$ may be provided, which are fixed on the cover of the drum $f$ or on the upper wall of the admission chamber $e$, and which constitute a fastening for the conduit $g$, which latter can thus be removed at will from the drum $f$. A tightening washer $e^2$ may be interposed between each of the half collars and the cover of the drum $f$.

As the foreign bodies which are discharged from the lower part of the drum $f$ may contain kaolin which could be utilized, the waste in question may be passed through a decantation chamber and the kaolin, separated by any suitable means, may be fed once more into the charging funnel $c$. This operation of returning the waste may be repeated as desired.

As is shown in the figures, a collecting chamber $h$ or a series of such chambers arranged in parallel may be provided, with each one of which an aggregate $a, b, c, d, e$, and a battery of Cyclone selectors $f, g$ as also a battery of filters $i$ is associated. The process described may be carried out, especially in damp weather, by the aid of a stream of air which has been gently heated.

It should be mentioned that the duration of the treatment in the dry way according to the invention, lasts several seconds. The treatment in question eliminates the necessity for very thorough preliminary drying, i. e. almost complete drying, in view of the fact that the air which carries the material is constantly renewed and does not circulate in a closed circuit, in contradistinction to which, if the operation were carried out in a closed circuit, the air would pick up the moisture remaining in the circuit with which it has become charged during the earlier period of circulation.

It will, of course, be obvious that it would be possible to employ, instead of the discharge into the open air at the outlet of the filters, a discharge aided by apparatus such as ejectors adapted to create a slight diminution of pressure.

With certain starting materials which are strongly charged with foreign bodies, the total separation of the finished materials which it is desired to recover cannot be obtained in a single operation, and it is then necessary not to effect the treatment in an open circuit, but to bring into an operative cycle the materials recovered at the bottom of the said Cyclone selectors.

Fig. 3 shows diagrammatically an installation which renders it possible to operate in this manner. This installation is provided similarly to that of Fig. 1 with a charging device $c, b$ connected to a blowing or aspirating device, such as a fan $a$, which blows or sucks air or gas into the installation, which air or gas drives a charge of the materials to be treated from the said charging device $c$, which may be constituted by a funnel and which may be fed by hand but which is preferably mechanically fed, the said air or gas carrying the material through a common collecting chamber or passage $e$ into a series of Cyclone selectors $f$—$g$.

In this case the chamber or passage $e$ opens at its discharge end $e^1$ into the upper part of a box $k$ closed at its lower part by a bottom $k^1$, which is capable of being removed or drawn back. At the discharge end $e^1$, a vane, a register, a plurality of associated vanes or any other similar member $m$, rendering it possible to regulate as desired the cross section of the communicating passage between the chamber $e$ and the box $k$—$k^1$, is provided. The box $k$—$k^1$ serves for the reception of the heavy materials which, owing to their inertia have preserved a certain amount of kinetic energy enabling them to pass through up to the inlet $e^1$ of the said box, the said materials constituting a definite residue which can be cleared out periodically. By suitably regulating the cross section of the inlet opening into the box $k$ any circulation of air in the latter is prevented.

As in the constructional form shown in Fig. 1, the air, which is charged with the fine materials to be recovered and which escapes at the upper part $g^3$ of the axial conduits $g$ of the Cyclone selectors $f$—$g$, is passed into a device for filtering the said materials, such as a battery of electric filters $i$, against the walls of which the materials are precipitated. In this case, however, the conveying air, which may normally still contain about 5% of useful material, instead of being discharged into the open air is conveyed into a conduit $n$, $n^1$ open at one end $n^1$ and into the other end of which there opens, on the one hand, a conduit $n^2$—$n^3$ connected at $n^3$ to the suction pipe of the blower $a$ and on the other hand a conduit $n^4$ connected to the suction pipe of an auxiliary blower $a^1$ the discharge pipe $a^2$ of which is connected to a suitable filtering device of known kind, such as an electric filter (not shown).

The employment of the outlet conduit $n$ connected to the principal blower $a$ and combined with an auxiliary blower $a^1$ presents the following advantages:

1. It renders it possible to recover all the fine particles of kaolin or other material under treatment which have not been separated in the first filters $i$.

2. It renders it possible to renew partially the air which is circulated in the machine, which is of importance when the material to be treated contains moisture inasmuch as the material may in this manner be dried by simple blowing. It is thus rendered possible to dry materials containing from 5–6% of moisture. It will, of course, be understood that the quantity of auxiliary air employed will be proportional to the amount of moisture which is to be eliminated.

When hot air is employed the arrangement may be such that the air can only be renewed partially and in proportion to the moisture which is to be eliminated, which renders it possible to effect an economy in the heat expenditure.

The charging device $c$ into which the crushed materials to be treated after having undergone the desired preliminary preparation are fed, preferably by mechanical means, comprises, as in the constructional form shown in Fig. 1, a suitably adjustable member of any suitable known type connected to the blower piping (see Fig. 1) or to the suction piping as is shown in Fig. 3. The quantity of raw material to be admitted will be equal to the sum of the weight of the merchantable material recovered in the filters and the weight of the residues recovered in the box $k$ from which the latter are periodically discharged.

The material which is precipitated at the lower part of the Cyclone selectors $f$ may be returned to the charging device $c$ by simple aspiration, by blowing or by any suitable known mechanical means and will then enter once again into the cycle of operations until the separation is completed. The finished merchantable materials are recovered for the most part at $j$, the particles which have passed out with the air being recovered in the filters connected at $a^2$ to the blower $a^1$.

When the materials to be passed through the apparatus are moist and contain, for example, 5–6% of moisture it is preferable that the proportion of raw material coming directly from the crushers and admitted into the charging device $c$ should be equal at most to $\frac{1}{10}$ of the weight of the quantity of material removed from the lower part of the Cyclone separators and fed into the charging device in order to pass again through the cycle of operations until the refinement is completed. In this manner there is obtained in the charging device a mixture of material the percentage of moisture of which is about 2% at the most, which facilitates the air drying of the materials circulating in the machine.

The employment of the improved arrangement which has just been described presents besides the advantages set forth above, the further advantage of rendering it possible by the use of any desired surcharge of material, to obtain a complete saturation of the air passing out of the filters. When it is desired to employ hot air it is possible to re-heat the latter before its admission at $n^1$ into the conduit $n$ or before its admission at $a$. It is likewise possible to arrange the Cyclone selectors $f$, $g$ in a box or a suitable framework in which the hot gases circulate, the air being thus heated in its passage through the separating devices.

Although with certain powdered starting materials the constructional form of the installation as above described and the features of the Cyclone selectors hereinbefore set forth are sufficient to ensure good separation, the applicants have nevertheless found that in certain cases it is possible for a small proportion of foreign bodies to be carried out with the refined materials passing out at the upper part of the axial conduits $g$ of the said Cyclone selectors.

In order to remove this disadvantage an auxiliary separating device may be arranged in the path of the gaseous stream charged with the refined materials. The constructional form of the auxiliary separator may be varied considerably. Instead of directing the gaseous stream passing through the upper opening $g^3$ of the conduit $g$ directly towards the filtering devices such as electric filters of known type, the said opening may be arranged as is shown in Fig. 4 in the lower compartment $I$ of a chamber $I$, $2$, the said compartment being separated from the upper compartment $2$ at the level of the said opening by a throttling device $3$, $3'$ of suitable form. The walls of the throttling device form guiding surfaces for the gaseous stream charged with the products to be recovered. An annular space $4$ is, however, left free between the outlet of the axial tube $g$ and the inlet into the communicating passage between the two compartments $I$ and $2$. The two superposed compartments $I$, $2$ may communicate through the medium of valves, vanes or registers ($5$, $6$ respectively) the position of which is adjustable, with known filtering devices such as electric filters ($i$, $i'$ respectively). By the employment of the throttling and blowing device $3$, $3'$ a further separation is obtained, any heavier products contained in the gaseous stream passing into the upper compartment $2$ and from there through the valves $6$ on to the auxiliary or secondary filters $i^1$, whilst the refined materials pass out alone through the valves $5$ to the normal or primary filters $i$.

In the constructional form shown in Fig. 4, the throttling passage which separates the lower compartment $I$ from the upper compartment $2$ is constructed in the form of an inverted funnel $3$, $3'$ the large lower end of which, i. e. the entry end, is located substantially at the level of the discharge opening of the pipe $g$ in such manner that an annular space $4$ is left between itself and the latter. Since the gaseous stream rising from the drum $f$ has still a rotary movement in the interior of the axial conduit $g$ the heavier particles contained in it are thrown upon emergence from the conduit against the truncated conical walls of the passage $3$, $3'$ and pass through this passage into the compartment $2$. On the other hand the fine particles of smaller weight are carried with the gas through the valves $5$ of the compartment $I$ to the filters $i$.

It is, of course, possible, if it is thought that it is unnecessary to recover the less fine materials carried through opening $3'$ of the separating and throttling passage $3$, $3'$ to do without the auxiliary filters $i^1$ or simply to recover these materials in the chamber $2$.

In the constructional form shown in Fig. 5 the throttling passage $3$, $3'$ for effecting the auxiliary separation comprises, as in the preceding example, a kind of reversed funnel between the lower compartment or chamber $I$ and the upper compartment $2$. In this case the throttling surfaces $3$ may be supplemented by a central guiding member $3''$ of suitable shape, for example, it may be hemispherical, conical or of similar shape adapted to facilitate the passage of the gaseous stream, the said central member being arranged so as to leave between its upper edge and the upper end $3'$ of the throttling passage a free annular space $7$.

If it is only desired to take advantage partially of the auxiliary separating device which has just been described in its complete form, the upper compartment $2$ may be eliminated and the guiding and the throttling passage may be replaced by a simple throttling cone arranged on the cover of the chamber $I$ around and at a short distance from the opening $g^1$ of the axial conduit $g$. This arrangement is shown diagrammatically in partial section in Fig. 6.

In this case the heavier particles carried through the opening $g^1$ by the rotary movement of the gaseous stream and thrown by their kinetic energy against the walls of the conical baffle $3$, lose their velocity on contact with the said walls and are then thrown through the annular space $4$ to the bottom of the compartment $I$ whilst the finer particles are carried beyond the said compartment through openings of suitable cross section controlled by valves or vanes $5$, to the filters $i$ or other similar devices.

Figure 7 shows at its lower part a particular constructional form of the lower part of the drum $f$ of the Cyclone selectors.

It is sometimes advantageous to avoid the axial accumulation of the foreign bodies and heavy particles at the bottom of the drums and especially to avoid a braking action being exerted on the latter. In other words it is often desirable to facilitate as far as possible the discharge of the said heavy particles and consequently not check their downward motion. This object can be attained by means of an improvement consisting in providing the drums with an annular peripheral discharge opening $f^2$ of small width formed between the interior wall of the drum $f$ and bottom $f^1$ coned in the reverse direction to that of the usual bottoms, or having any other suitable shape. The said bottom may be connected at various points to the wall $f$ by means of ribs $f^3$, whatever may be the material of the drum, for example, metal, glass or fibre.

In the neighbourhood of the outlet $f^2$ a pressure will be obtained in this manner which is substantially equal to atmospheric pressure. The heavy particles which are first thrown against the wall of the drum and then descend along the said wall will be influenced by the full force of gravity to aid their discharge from the apparatus. The fine particles will remain confined to a part sufficiently far away from the walls and will be carried towards the axial conduit $g$ by the ascending gaseous stream as has been explained above.

As is shown in the upper part of Figure 7, the helical elements $g^1$, $g^2$ which enclose the helicoidal conduits formed between the inner wall of the drum $f$ and the outer wall of the axial conduit $g$ may, according to the invention, be adapted to leave a free passage $o$ of small width in the neighbourhood of the lower opening of the said conduits.

This free passage, during the operation of the apparatus, will be constantly filled up by the heavy particles already carried towards the wall of the drum and passing by the action of gravity on their downward path towards the lower part of the apparatus. This arrangement is employed in addition to the particular constructional form of the drum in order to facilitate the discharge of the heavy particles.

The constructional form shown in Figure 3 may be combined with Cyclone selectors according to Figure 4. In this case the blower $a^1$ in place of aspirating into a conduit $n$ will aspirate into the compartments 2, the auxiliary filters $i'$ being arranged at the outlet of the said blower instead of being located at the outlet of the compartments 2.

We claim:

1. The combination of a drum, an axial conduit in said drum, the interior diameter of said conduit being from ⅝ to ⅞ the diameter of the drum and said conduit opening at one end into said drum and at the other end into an expansion chamber, helical vanes in the annular space between said drum and conduit, means supplying a current of gas to one end of said drum, means supplying pulverulent material to said gas current whereby the said current becomes a carrier for said material, and filtering means connected with said expansion chamber and through which the carrier gas escapes, whereby the coarser particles are eliminated from the gas current within said drums and the ultra fine particles are eliminated by said filtering means.

2. The combination of a drum terminating in a lower conical portion, and an expansion chamber, a conduit arranged axially within said drum and leading therefrom to said expansion chamber, the interior diameter of said conduit being approximately ¾ the diameter of the drum and the height of the lower end of said conduit above said conical portion of the drum being approximately 2.5 times the diameter of the drum, helical vanes in the annular space between said drum and conduit, means supplying a current of gas to the upper open end of said drum, means supplying pulverulent material to said gas current whereby the gas becomes a carrier for said material, and filtering means through which the gas passes in its exit from said expansion chamber, whereby coarser particles of the pulverulent material are deposited in said drum and the ultra fine particles are collected by said filtering means.

3. In an apparatus for separating the coarser particles from the ultra fine particles of pulverulent material, the combination of means supplying a current of gas under pressure, means feeding the pulverulent material to said gas current whereby the latter becomes a carrier for the pulverulent material, a vertical drum open at its upper end and having a conical lower end portion, an expansion chamber above said drum, and a conduit arranged axially within said drum and leading from said drum into said expansion chamber, the interior diameter of said conduit being approximately ¾ the interior diameter of said drum, helical vanes located in the annular space between said drum and conduit, a conduit conducting said current of gas to the upper open end of said drum and terminating beyond said drum in a closed chamber, means regulating the opening of said conduit into said closed chamber, and filtering means connected with said expansion chamber, whereby the coarser particles are eliminated from said gaseous carrier before it enters said expansion chamber and the ultra fine particles are eliminated therefrom by said filtering means.

EMILE SOYEZ.
MARCEL CHÉROUVRIER.